United States Patent
Gill

Patent Number: 5,149,547
Date of Patent: Sep. 22, 1992

[54] APPARATUS FOR MULTI-CAVITY INJECTION MOLDING

[75] Inventor: Antony Gill, Rochester, Mich.

[73] Assignee: Automotive Plastic Technologies, Inc., Sterling Heights, Mich.

[21] Appl. No.: 713,938

[22] Filed: Jun. 12, 1991

[51] Int. Cl.$^5$ .............................................. B29C 45/77
[52] U.S. Cl. ............................... 425/145; 264/328.15; 425/549; 425/562; 425/564; 425/572
[58] Field of Search ............... 425/130, 145, 146, 147, 425/549, 562, 563, 564, 572, 588, 812; 264/297.2, 328.8, 328.9, 328.15, 572

[56] References Cited

U.S. PATENT DOCUMENTS

| | | | |
|---|---|---|---|
| 4,095,931 | 6/1978 | Reitan | 425/564 |
| 4,101,617 | 7/1978 | Friederich | 264/572 |
| 4,279,582 | 7/1981 | Osuna-Diaz | 425/549 |
| 4,781,554 | 11/1988 | Hendry | 425/130 |
| 4,824,732 | 4/1989 | Hendry et al. | 264/37 |
| 4,923,666 | 5/1990 | Yamazaki et al. | 425/812 |
| 4,923,667 | 5/1990 | Sayer | 425/546 |
| 4,943,407 | 7/1990 | Hendry | 425/546 |

*Primary Examiner*—Tim Heitbrink
*Attorney, Agent, or Firm*—Dykema Gossett

[57] ABSTRACT

Apparatus and methods suitable for controlling and metering thermoplastic material or resin to multiple cavities in a multi-cavity injection molding tool are described, whereby the amount of resin injected into each cavity can be individually controlled. This system minimize overfilling or underfilling of individual article cavities in such a multiple cavity tool and, therefore, allows for the production of more uniform plastic articles from a multiple cavity mold or tool. In practice, a spindle, which is designed to rotate in a reproducible manner as resin flows past it, is inserted into the resin stream feeding each cavity. The amount of resin fed to a particular cavity is determined by measuring the rotation of the spindle. When the amount of resin fed to a particular cavity is equal to the amount appropriate for that cavity (the target amount), the shut-off valve associated with that cavity is activated, thereby terminating the resin flow to that cavity without affecting resin flow to the other cavities. Resin flow is continued until all cavities are filled with their respective target amounts of resin. The apparatus and methods of this invention are especially adapted for use in gas-assisted injection molding using multi-cavity equipment.

9 Claims, 5 Drawing Sheets

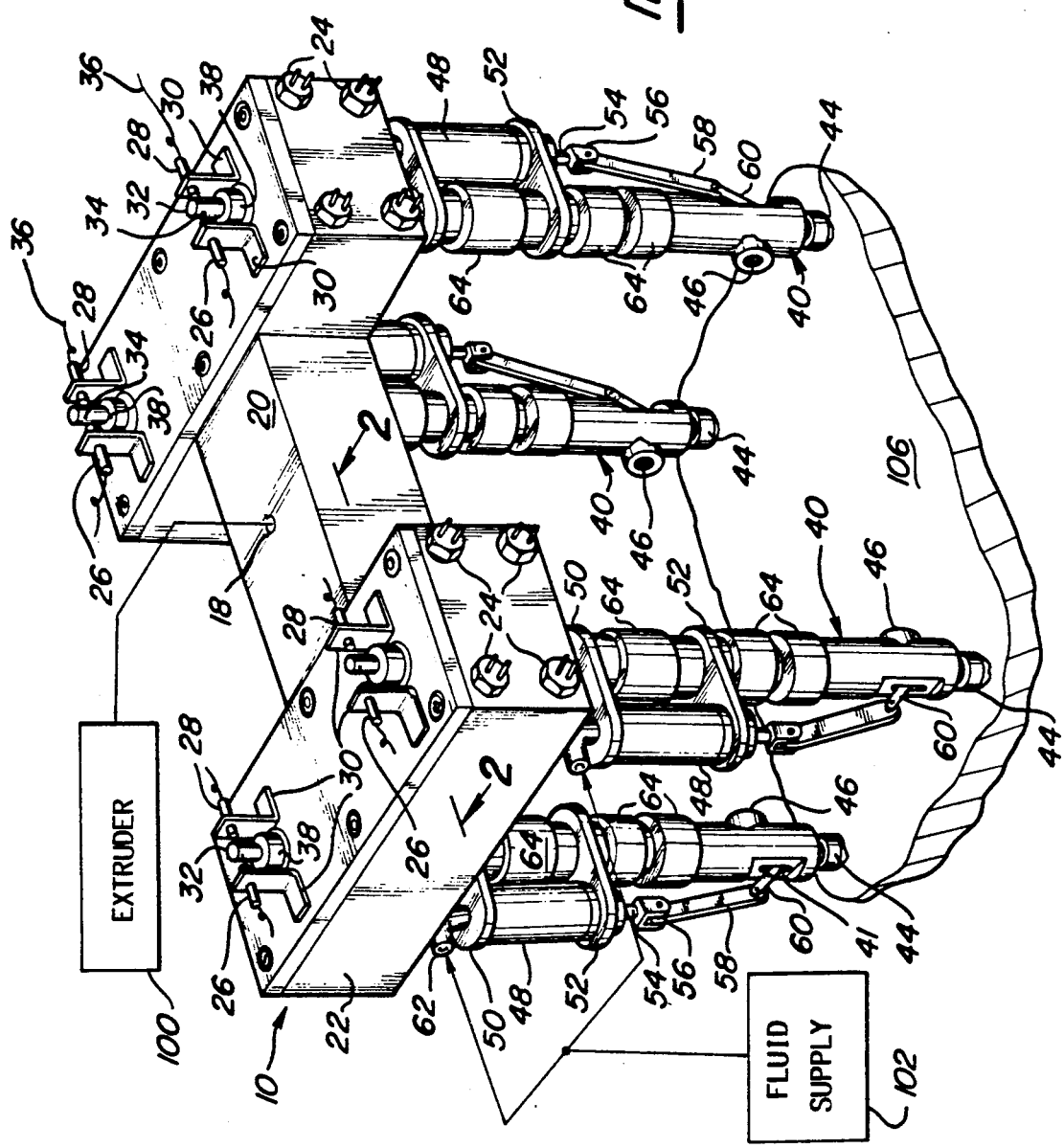

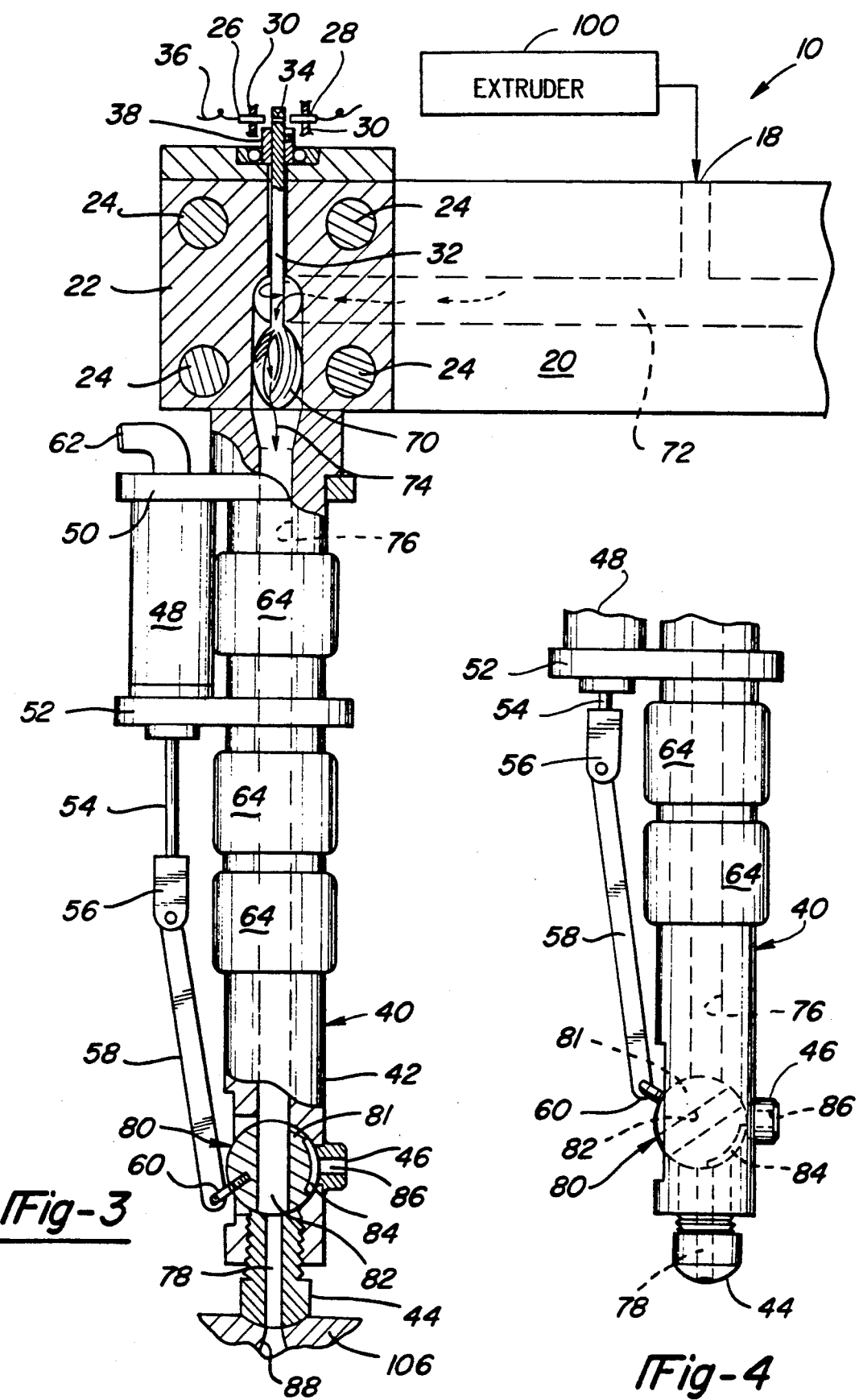

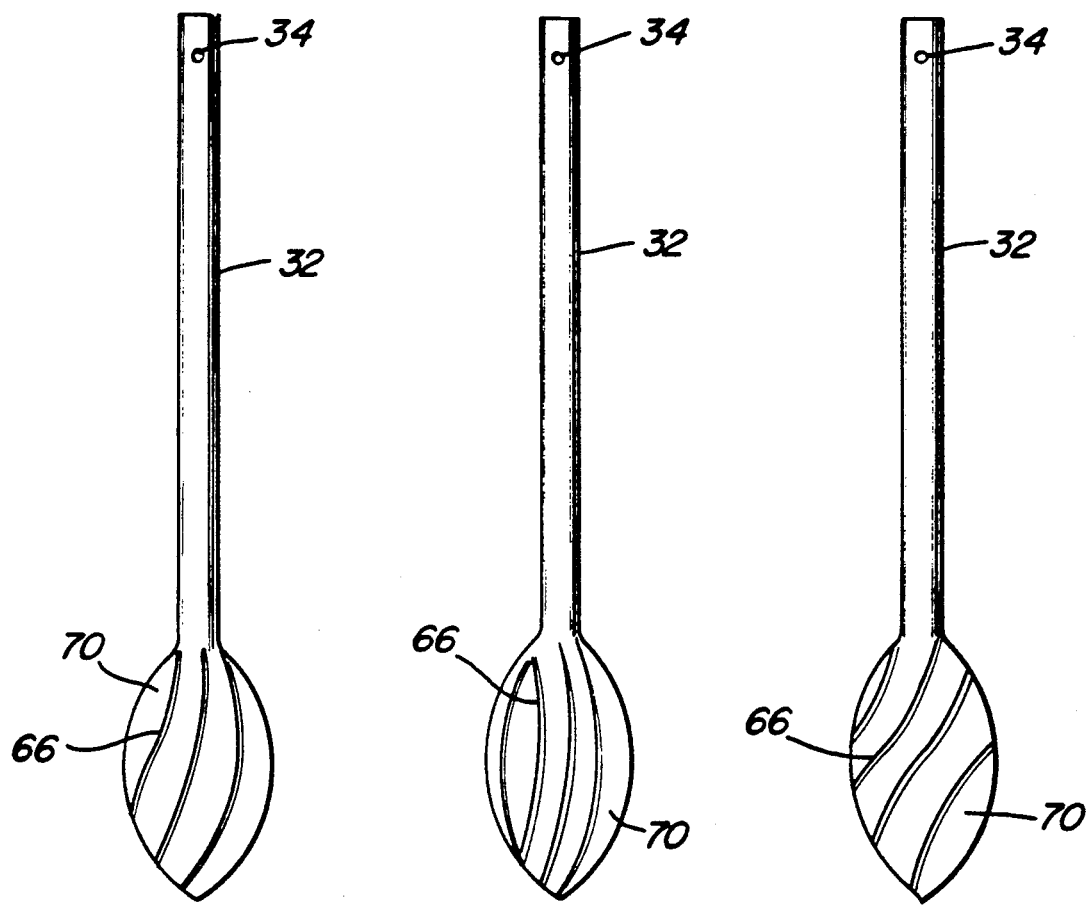
*Fig-11A*  *Fig-11B*  *Fig-11C*

APPARATUS FOR MULTI-CAVITY INJECTION MOLDING

BACKGROUND OF THE INVENTION

1. Field of the Invention

The present invention relates to the preparation of plastic articles by injection molding and gas-assisted injection molding techniques in which multiple cavities are simultaneously filled with plastic material. A new and improved method and apparatus for injection molding has been discovered whereby the amount of resin injected into each cavity of a multiple cavity mold or tool can be individually controlled. This system prevents either overfilling or underfilling of individual article cavities in such a multiple cavity tool and, therefore, allows for the production of more uniform plastic articles from a multiple cavity mold or tool.

2. Description of the Prior Art

Injection molding with multi-cavity molds has been used to produce multiple plastic articles simultaneously. These multiple articles can all be the same size and shape or they can be different sizes and shapes. In general, plastic material is fed to a single entry point or central sprue of the injection molding system from a plastic extrusion machine and then distributed to the various article cavities. Several methods of distributing the plastic material to the various cavities have been developed.

In one general type of distribution system, plastic material is fed into a single plastic entry port and then allowed to flow through runners or channels to the various cavities. In another distribution system, plastic material is fed into a single plastic entry port and allowed to flow through distribution passages to separate nozzles for injection into the individual cavities. This latter system is generally referred to as a "hot-manifold" system or mold. The hot-manifold system generally uses cartridge heaters within the steel block containing the distribution system and heaters associated with the nozzles to keep the plastic material in a molten state.

. Both of these systems, while allowing the production of multiple plastic articles in a single molding cycle, suffer from serious drawbacks. Article cavities far removed from the single plastic entry point can easily receive too little plastic material, while those near the entry point can receive too much. In non-gas-assisted injection molding this problem can be at least partially solved by simply packing all the cavities with the maximum amount of plastic material. But very high plastic pressures are required to insure that the cavities furthest removed are fully packed. Such high pressures can create mold design and maintenance problems as well as higher operating costs.

And, of course, such a full-packing approach cannot be used in gas-assisted injection molding. Furthermore, the problems associated with unequal plastic distribution are even more apparent in gas-assisted injection molding. If a cavity receives too little plastic material, the resulting article may have thin wall areas or even holes that render the article useless. And if a cavity receives too much plastic material, significant increases in weight may result because of increased wall thickness.

Attempts to overcome these problems have involved the careful design and construction of the distribution channels within the molds to allow more even cavity loading independent of the location of the cavity. For example, cavities close to the plastic entry point could have relatively small diameter runners supplying plastic material whereas cavities far removed from the plastic entry point could be fed by larger diameter runners. In addition to significant design and cost problems, this approach has proven to be less successful than desired, especially as the number of cavities and the complexity of the required distribution system increases. In another approach, cavities are arranged so that each cavity is equidistant from the central plastic entry port. For example, the cavities could form a circle around the entry port. Such an approach significantly limits the number of cavities that in such multiple cavity tools.

In U.S. Pat. No. 4,279,582, a method is disclosed to individually control the amount of plastic in each cavity by the independent closing and opening of individual cavity gates in a non-gas-assisted injection molding process. Each gate is opened for a predetermined length of time to allow the cavities to be filled with the appropriate amount of plastic. At the end of the predetermined time, which could vary for each cavity, the individual gates are closed, thereby stopping the flow of plastic into that cavity. Each gate is controlled by a double action fluid motor and can be independently adjusted to vary size of the gate opening. Although this system represented an improvement in the art, it still retains significant limitations and problems. Variations in the plastic used, injection pressure, temperature, viscosity, flow rates, or other operational variables could result in each cavity receiving either too much or too little plastic material. In addition, the determination of the appropriate time for each gate to remain open and the appropriate size of the gate opening presented significant practical problems. Any changes in the opening and closing regime or in the gate dimensions for one cavity would likely affect plastic loading for other cavities. As the number of cavities or the complexity of the molded articles increases, the drawbacks and limitations of such a gate control approach becomes even more apparent. Furthermore, closing the gates does not provide positive shut off of the plastic flow. Incomplete gate closing is especially troublesome in gas-assisted injection molding. Therefore, the procedures of U.S. Pat. No. 4,279,582 are best employed with relatively simple molds having relatively few cavities and with non-gas-assisted injection molding.

Thus, the injection molding art still needs an effective and reproducible distribution system and method for filling and controlling the plastic loading of multiple cavities. The present invention, as detailed below, provides such a system and method to individually control and meter plastic material into article cavities in a multiple cavity injection mold.

SUMMARY OF THE INVENTION

In accordance with the present invention, there is provided a method and apparatus for controlling and metering molten plastic material to multiple article cavities in a multiple cavity injection molding system. Although this invention can be used in either non-gas-assisted or gas-assisted injection molding, it is especially adapted for use in a gas-assisted injection molding process. In practice, the flow of plastic material is initially directed to all the cavities within the mold while, at the same time, the amount of plastic material entering each individual cavity is measured. For a given cavity, once the appropriate or target amount of plastic material has been injected into the cavity, plastic flow to that cavity is terminated. Plastic flow is allowed to continue to the other cavities until all cavities have received the appropriate or target amount of plastic material. Once all cavities have been filled with the appropriate amount of plastic material, the articles are formed, cooled, and ejected from the mold.

The present invention is especially adapted for gas-assisted molding of complex-shaped articles in a multiple cavity injection mold. The control of individual cavities within such a mold readily allows for the production of multiple articles of varying shapes and sizes within a single injection mold or tool.

One object of this invention is to provide a process for injection molding a plurality of plastic articles in an injection mold with multiple cavities, where the process includes:

(a) feeding plastic material to the individual cavities;
(b) separately measuring the amount of plastic material fed to each individual cavity;
(c) separately comparing the amount of plastic material fed to each individual cavity with the target amount of plastic material for that cavity, wherein the target amount of plastic material for each cavity is the desired and appropriate amount of plastic material for that cavity;
(d) separately stopping the plastic flow to an individual cavity when the amount of plastic fed to that cavity equals the target amount for that cavity, while continuing the plastic flow to other cavities where the amount of plastic fed has not exceeded their target amounts;
(e) repeating steps (b) through (d) until all the cavities have been filed with their respective target amounts of plastic material and the plastic flow to all cavities has been stopped;
(f) allowing the plastic articles within the individual cavities to cool sufficiently to be self supporting; and
(g) removing the plastic articles from the multiple cavity mold.

Another object of this present invention is to provide a process for injection molding a plurality of plastic articles in an injection mold with multiple cavities, where the process includes:

(a) feeding plastic material to each of the cavities;
(b) separately measuring the amount of plastic material fed to each individual cavity;
(c) separately comparing the amount of plastic material fed to each individual cavity with the target amount of plastic material for that cavity, wherein the target amount for each cavity is the desired and appropriate amount of plastic material for that cavity;
(d) separately stopping the plastic flow to an individual cavity when the amount of plastic fed to that cavity equals the target amount for that cavity, while continuing the plastic flow to other cavities where the amount of plastic fed has not exceeded their target amounts;
(e) separately injecting a pressurized gas into the plastic material within each cavity once that cavity has been filled with its target amount of plastic material, thereby forcing the plastic material to conform to the shape of the cavity;
(f) repeating steps (b) through (e) until all the cavities have been filed with their respective target amounts of plastic material, the plastic flow to all cavities has been stopped, and pressurized gas has been injected into the plastic material within each cavity;
(g) allowing the plastic articles within the individual cavities to cool sufficiently to be self supporting;
(h) venting the pressurized gas from the injection mold cavities to atmosphere; and
(i) removing the plastic articles from the multiple cavity mold.

Still another object of this present invention is to provide an injection molding apparatus for use with a multiple cavity injection mold to produce a plurality of plastic articles, where the injection molding apparatus includes:

(a) a plurality of nozzles wherein each nozzle contains a resin passageway within the nozzle body, wherein the resin passageway is in fluid communication at a downstream location with an associated article cavity within the multiple cavity injection mold;
(b) a resin manifold having an entry for connection with a resin extrusion machine and having a number of manifold passageways equal to the number of nozzles, where one end of each manifold passageway is in fluid communication with the entry and the other end of each manifold passageway is in fluid communication with the upstream end of the resin passageway of an associated nozzle;
(c) a separate spindle for each nozzle, where the spindle is located within the resin passageway of the associated nozzle or within the associated manifold passageway and where the spindle is adapted to rotate in a reproducible manner in response to resin flowing around and past the spindle from an upstream to downstream direction;
(d) a separate shut-off valve for each nozzle, where each shut-off valve is located within the resin passageway between the upstream end of the nozzle and the associated article cavity whereby the flow of resin can be controlled; and
(e) a separate means for each nozzle for measuring the number of rotations the spindle associated with that nozzle makes due to resin flowing around and past the spindle, whereby for each nozzle, when the number of spindle rotations reaches a predetermined number for that nozzle, the shut-off valve for that nozzle can be activated to stop the flow of resin to that nozzle's associated article cavity independently of the flow of resin to the other article cavities.

Other objects and advantages of the present invention will be apparent from a consideration of this specification, including the appended claims and accompanying drawings.

BRIEF DESCRIPTION OF THE DRAWINGS

FIG. 2 is a perspective view of the hot-manifold system of this invention.

FIG. 3 is a partial sectional view of the hot-manifold system showing one nozzle, taken along the section line 2—2' of FIG. 2. The position of the shut-off valve is such that the plastic material can flow into the associated article cavity.

FIG. 4 is a partial sectional view of the nozzle shown in FIG. 3. The position of the shut-off valve is such that (1) the plastic material cannot flow into the associated article cavity and (2) the pressurized gas can be injected into the plastic material within that cavity.

FIGS. 4-6 are top views of the optical measuring system where the optical passages are located in the spindle shaft. FIG. 8 is a perspective view of the optical measuring system where the optical passages are located in a disk attached to the spindle shaft. FIG. 9 is a top view of the disk of FIG. 9. And FIG. 10 is a sectional view of the disk of FIG. 9, taken along section line 9-9' of FIG. 9.

FIGS. 11A, 11B, and 11C show several possible arrangements of the flukes or blades on the spindle used to measure plastic flow.

The present invention is not to be limited to the details of construction and arrangement of parts as illustrated in the accompanying drawings as the invention is capable of other embodiments and of being practiced in various ways within the scope of the appended claims. Furthermore, the terminology used in this present specification is for the purpose of description and not of limitation.

DESCRIPTION OF THE PREFERRED EMBODIMENTS

The present invention relates to the injection molding of plastic articles using non-gas-assisted or gas-assisted techniques. More specifically, this invention relates to the preparation of plastic articles where multiple article cavities are simultaneously filled with plastic material. Using the procedures of this invention, the amount of resin injected into each cavity of a multiple cavity mold or tool can be individually controlled or regulated. This system prevents either overfilling or underfilling of individual article cavities in such a multiple cavity tool and, therefore, allows for the production of more uniform plastic articles from a multiple cavity mold or tool in a more efficient manner.

The present invention involves introducing plastic material into the various cavities of a multiple cavity injection mold, separately measuring the amount of plastic material introduced into each cavity, and then separately stopping the flow of plastic material into each cavity when and as the amount of plastic material injected into that cavity reaches a predetermined level. When the desired amount of plastic material is injected into a particular cavity, the plastic flow to that cavity is terminated without affecting the flow to any other cavity. In this manner, the appropriate amount of plastic material is delivered to each cavity.

Figure 1:
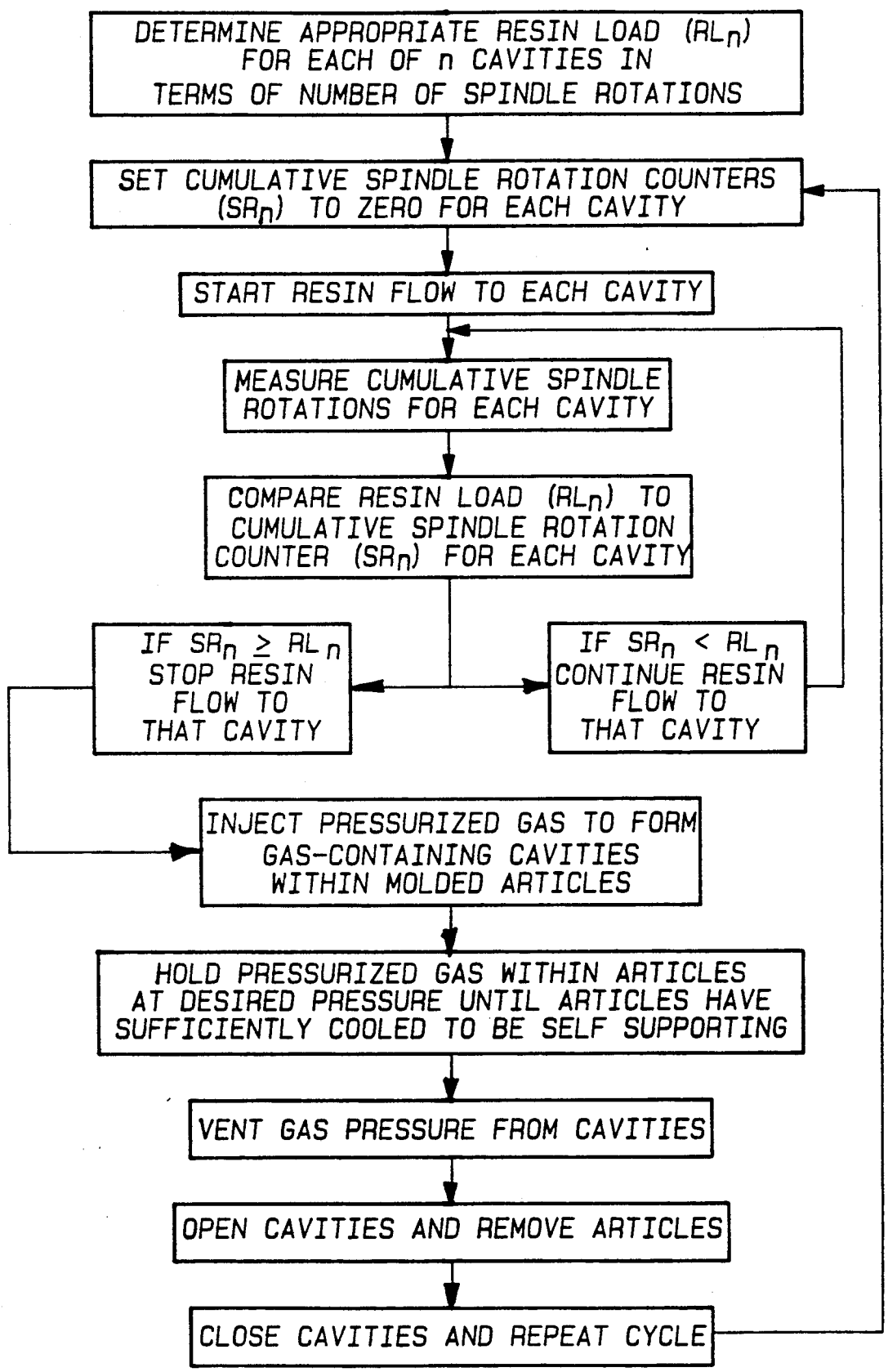
FIG. 1 is a flow chart showing the steps followed during gas-assisted injection molding using the process of this invention.

The overall process of this invention, as applied to gas-assisted injection molding, is illustrated in the flow chart of FIG. 1. (The process of this invention as applied to non-gas-assisted injection molding is essentially as illustrated in FIG. 1 without the steps related to the injection and venting of the pressurized gas.) In the first instance, the appropriate or target amount of plastic material for each cavity is estimated or determined. This can be done in a number of ways. For example, based on the cavity size and the desired thickness of the article walls, the amount of plastic material can be calculated for each cavity using standard procedures. Or a series of test moldings can be carried out or "shot" with varying amounts of plastic material. By examining the articles produced in this test series, the most appropriate level of injected material can be determined (using, if necessary, standard interpolation techniques). And in many instances, it may be possible for those skilled in the art to estimate the appropriate amount of plastic based on experience; refinements to these estimates could be carried out if necessary or desired.

Once the target amount of plastic material (as measured using any convenient weight or volume units) is known for each cavity in the mold, these target values should be converted to "equivalent spindle rotations" for each cavity. For purpose of this invention, an "equivalent spindle rotation" is the amount of plastic resin flowing around and past the spindle that results in that spindle completing a single rotation. For cavity 1, this target value is $RL_1$; for cavity 2, it is $RL_2$; and so on until, for the nth cavity in a mold containing n cavities, it is $RL_n$ ("RL" is simply shorthand for the target "Resin Load"). To illustrate this conversion process, consider the following hypothetical example. Assume that for a given cavity it was determined that the appropriate amount of plastic material is 10.0 grams and that the spindle completes one revolution as 2.5 grams of resin flow around and past it. For this example, the appropriate or target amount of resin is equivalent to four (4) spindle rotations. As suggested by the above example, it is also necessary to determine the amount of plastic material which will be delivered by a given nozzle per spindle rotation. This can be done using conventional calibration techniques. For example, the amount of plastic material injected from each nozzle can be collected in separate, tarred vessels. Dividing the amount of plastic material collected by the corresponding number of revolutions recorded will provide the desired values.

Before beginning a molding cycle, the cumulative spindle counters are set to zero. Setting the counters to zero before a molding cycle is necessary because the amount of plastic injected into each cavity will be determined by cumulatively measuring the number of spindle rotations associated with that cavity. The counters (not shown in the figures) can be any conventional mechanical or electronic counting device (including a computer) which can cumulatively track the number of rotations of the spindles associated with each mold cavity. The number of counters should be equal to the number of cavities in the multiple cavity mold.

Having set the cumulative spindle counters to zero, the plastic or resin flow to the various cavities can be started. As the plastic flows to each cavity, the number of spindle rotations for each cavity is separately measured on a cumulative basis. For cavity 1, this value is $SR_1$; for cavity 2, it is $SR_2$; and so on until, for the nth cavity in a mold containing n cavities, it is $SR_n$ ("SR" is simply shorthand for "Spindle Rotation").

For each cavity, the number of spindle rotations is compared to the target level of plastic material. If, for any cavity, $SR_n$ is less than $RL_n$, the plastic flow to that cavity or cavities should continue as such cavities have not received their target amounts of plastic. On the other hand, if $SR_n$ is equal to or greater than $RL_n$, the plastic flow to that cavity or cavities should be stopped; such a cavity or cavities have received the target amount of plastic once $SR_n$ equals $RL_n$. Once $SR_n$ reaches the $RL_n$ value, the shut-off valve (more fully described below) should be activated to terminate plastic flow to that cavity. The plastic flow should continue until the target amount of plastic has been delivered to all the cavities within the mold.

Once each cavity is filled with the target amount of resin, the injection molding process proceeds in the normal manner. With gas-assisted injection molding, the pressurized gas can be injected into each article cavity to form a gas-containing cavity within each of the molded articles. In fact, this pressurized gas can be injected into a cavity using the same valve used to shut off the plastic flow to that cavity. It is generally preferred that the pressurized gas is injected into a given cavity as soon as, or shortly after, that cavity is filled with the desired amount of resin. It is not necessary to wait for all cavities to be filled with their desired resin levels before beginning the gas injection process for cavities which are filled with their desired resin levels. This feature of the present invention, whereby gas can be injected into already filled cavities while continuing to fill other cavities, allows for production of different sized parts during the same molding cycle. Of course, if desired and appropriate, the gas injection can be delayed until all cavities are filled.

The pressurized gas is held within the molded articles at the desired pressure until the articles have cooled sufficiently to be self supporting. After venting the pressurized gas to atmosphere, the mold can be opened and the molded articles removed. After closing the mold and resetting the cumulative spindle rotation counters to zero, the next cycle can begin (as shown in FIG. 1). It is not necessary, of course, to re-determine the appropriate resin load for the cavities at the beginning of the next or successive cycles. A re-determination of the appropriate resin load levels will only be required if the mold or other operating parameters are significantly changed.

The present apparatus and method can be incorporated into conventional molding procedures, such as those described in, for example, U.S. Pat. Nos. 4,101,617, 4,781,554, 4,824,732, 4,923,666, 4,923,667, and 4,943,407, which are hereby incorporated by reference, and in U.S. patent application Ser. No. 07/628,746 filed on Dec. 17, 1990, which is assigned to the same assignee as the present invention and which is also incorporated by reference.

A preferred embodiment of an apparatus suitable for carrying out the present invention is shown in FIG. 2. In this embodiment, plastic material from an extruder 100 or other plastic supply means is injected into the manifold sprue 18 of the hot manifold assembly 10. The manifold sprue 18 is located in the hot runner housing 20 which contains (as illustrated in FIG. 2) the hot runner 72, through which plastic material is delivered to the individual mold cavities (not shown) via the individual nozzles 40. Again referring to FIG. 2, to each end of the hot runner housing 20 is attached a manifold arm 22, which is further attached to two nozzles 40 hanging therefrom. The hot manifold assembly 10 shown in FIG. 2 has two manifold arms 22 and four nozzles 40. As those skilled in the art will understand, the apparatus of this invention can contain more manifold arms than shown in FIG. 2 and each manifold arm can contain more than two nozzles.

As shown in greater detail in FIG. 3, plastic material from the extruder 100 is injected into the manifold sprue 18 from which it passes into the hot runner 72. From the hot runner 72, the molten plastic or melt stream 74 flows to the individual manifold arms 22, past the spindle 70, and into the cylindrical bore 76 of the nozzle 40 hanging from the manifold arm 22. In order to keep the plastic molten during its passage through the manifold arm 22 and the nozzle 40, manifold heaters 24 extending through the manifold arm and nozzle heaters 64 affixed to the nozzle body 42 are provided.

The injection nozzle 40, which is shown in more detail in FIGS. 3 and 4, consists of a body portion 42 and a nozzle tip 44 which communicates with a multiple cavity mold or tool 106 through the mold sprue 88, which in turn leads to the cavity (not shown) associated with that nozzle. Each nozzle 40 has an injector gas port 46 through which a pressurized injection gas (not shown) can be injected into the plastic material within the cavity associated with that nozzle at the appropriate time during the molding cycle. To reach the mold cavity, the pressurized gas passes through gas passage 86, valve gas passage 84, nozzle tip passage 78, and mold sprue 88, as illustrated in FIG. 4.

Each nozzle also has a shut-off valve 80 to regulate the flow of molten plastic and pressurized gas. This shut-off valve consists of a spherical valve part 81 containing both a plastic passage 82 and a gas passage 84. The valve can be rotated between two positions. In the first position, as illustrated in FIG. 3, the plastic passage 82 is in fluid communication with both the cylindrical bore 76 and the nozzle tip passage 78, thereby allowing plastic to flow from the nozzle 40 to the multiple cavity tool 106. In the second position, as illustrated in FIG. 4, the plastic passage 82 is rotated out of communication with the plastic material contained in the cylindrical bore 76 and the nozzle tip passage 78. In this second position, the nozzle gas passage 86 is in fluid communication with the nozzle tip passage 78 via the gas passage 84 on the surface of the spherical valve part 81 of the shut-off valve 80. In this second position, a pressurized gas can be injected into the plastic material within the cavity, thereby forcing the plastic material to conform to the shape of the cavity. Generally, suitable pressurized gases include inert gases such as nitrogen, carbon dioxide, argon, and the like.

The shut-off valve 80 is operated by an air-driven cylinder 48 which is attached to the nozzle body 42 by upper and lower cylinder brackets (50 and 52) as shown in FIG. 3. Fluid from the fluid supply 102 to operate the cylinder is supplied via the fluid supply port 62. Preferred fluids for operating the cylinder 48 include air and hydraulic fluids. The cylinder shaft 54 can move back and forth between the two positions shown in FIGS. 3 and 4 to operate the shut-off valve 80. The cylinder shaft 54 is connected to the valve control pin 60 of the shut-off valve 80 via the linkage adapter 56 and the linkage arm 58. The valve control pin 60 reciprocates within the slot 41 (see FIG. 2) in the nozzle body, thereby moving the shut-off valve 80 between its two control positions. As can be seen in FIG. 2, when the cylinder shaft 54 is in its fully extended position, the shutt-off valve allows plastic to flow from the nozzle 40 to the multiple cavity tool 106. And as shown in FIG. 4, when the cylinder shaft 54 is in its fully withdrawn position, the shut-off valve blocks the flow of plastic material through the valve while allowing pressurized gas (104 in FIG. 2) to pass through the valve via gas passage 84 into the multiple cavity tool.

The shut-off valve 80 illustrated in FIGS. 3 and 4 is described in more detail in a co-pending application entitled "Injection Nozzle" Ser. No. 07/714,118, filed on Jun. 12, 1991 and assigned to the same assignee as this application. This copending application is hereby incorporated by reference. Other types of shut-off valves can also be used. For example the shut-off valve disclosed in another co-pending application entitled "Fluid Forcing Nozzle" Ser. No. 07/714,118, filed on Jun. 12, 1991 and assigned to the same assignee as this application can be employed. This co-pending application is also incorporated by reference. The shut-off valves described in U.S. patent application Ser. No. 07/628,746 can also be used. This application, which was filed on Dec. 17, 1990 and is assigned to the same assignee as the present application, is hereby incorporated by reference. The shut-off valves disclosed in U.S. Pat. No. 4,943,407, which is also incorporated by reference, can also be employed in the practice of this invention. Generally it is preferred that the shut-off valve is located in the nozzle as illustrated in FIGS. 3 and 4. It is further preferred that the shut-off valve is located as near the nozzle tip 44 as possible to minimize the amount of plastic contained in the nozzle tip passage 78 when the plastic flow is stopped by the shut-off valve. But as those skilled in the art will recognize, the shut-off valve is not required to be in the nozzle. For example, the shut-off valve could be incorporated as an integral part of the multiple cavity tool 106 as suggested in U.S. Pat. No. 4,943,407.

As noted above, the shut-off valve is activated to stop the flow of plastic to the mold cavity associated with a given nozzle when that mold cavity has received the appropriate or target amount of plastic material. As shown in FIG. 3, the amount of plastic material injected into a given cavity is determined using a spindle or impeller 70 placed in the plastic flow path. The spindle is adapted to rotate in a reproducible manner in response to plastic or resin flowing around and past the spindle from an upstream to downstream direction. By measuring the number of rotations of the spindle 70 resulting from the passage of plastic around and past it, the amount of plastic injected into the cavity can be determined. The spindle can be located in the manifold arm 22 (as shown in FIG. 3) or in the cylindrical bore 76 of the nozzle 40 (not shown). The spindle should not significantly restrict the flow of plastic material through the manifold arm 22 or nozzle 40.

As noted, the spindle is adapted to rotate as molten resin flows around and past it in the melt stream 74. Flukes or blades 66 (as best illustrated in FIGS. 11A, 11B, and 11C) can be used to force the spindle to rotate as the melt stream 74 flows towards the mold cavity. The spindles in FIGS. 11A, 11B, and 11C are designed to rotate about the long axis of the spindle shaft 32. The actual design of the spindle 70 and its blades 66 can vary considerably and may depend, at least in part, on the size of the "shot" or target amount for the cavity. For example, where small parts are being made the amount of plastic material required will be relatively small. For increased precision in such a case, the spindle should have sharply angled or spiraled blades 66 (as shown in FIG. 11C) so that it will rotate a significant amount with only the passage of a small amount of resin. For large parts, a much smaller blade angle or spiral (as shown in FIG. 11B) will still allow for a significant number of rotations. FIG. 11A illustrates a spindle with intermediate blades or spirals, which may be suitable for producing intermediate-sized articles. Looking at FIGS. 11A, 11B, and 11C, for the passage of a given amount of plastic material past each of the spindles shown, the number of rotations observed for these spindles would be in the following order: spindle 11C > spindle 11A > spindle 11B. As one skilled in the art will realize, spindles with different blade angles or blade arrangements will also be suitable in the practice of this invention so long as the spindle will rotate in a reproducible manner under the influence of resin passing around and by it.

Figure 5:
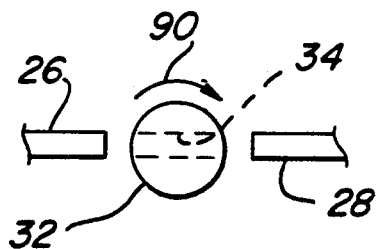
FIGS. 5-10 show various aspects of the optical rotational-measuring system.
Figure 6:
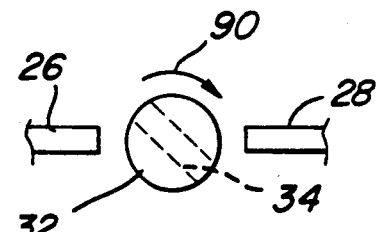
Figure 7:
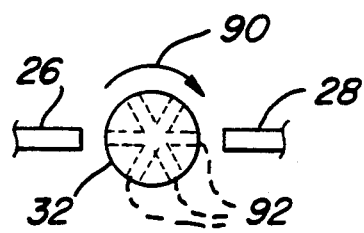
Figure 8:
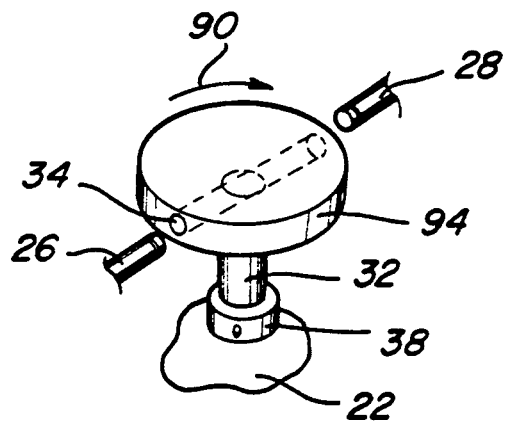
Figure 9:
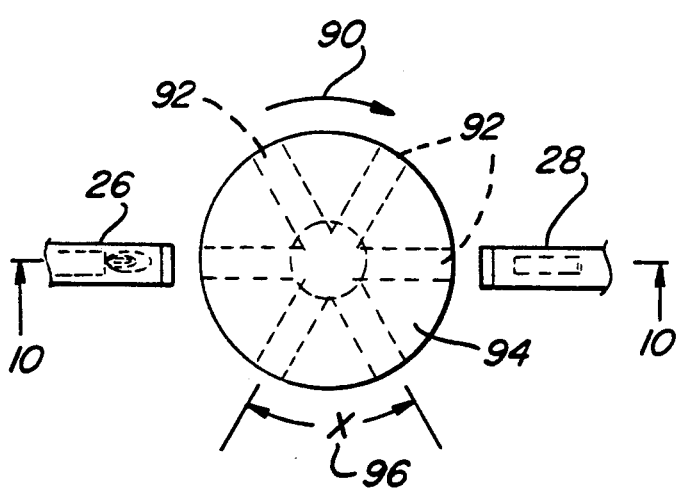
Figure 10:
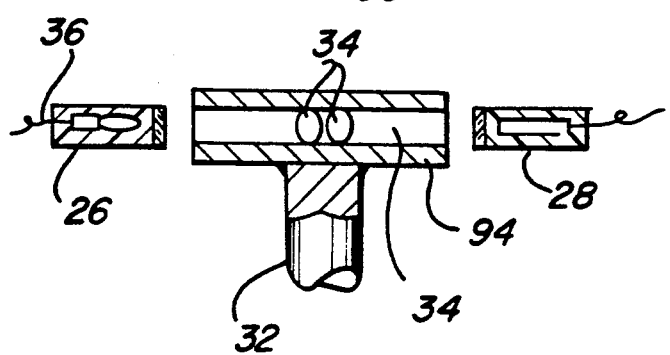

The spindle 70 is attached to a shaft 32 which extends outside the hot manifold assembly 10 so that the rotation of the spindle can be easily measured. The spindle shaft 32 passes through a bearing 38 so that it will rotate freely. It is preferred that the spindle 70 and its shaft 32 are hung vertically from the bearing 38 to minimize resistance to rotation. That portion of the spindle shaft 32 extending outside of the hot manifold assembly 10 has at least one optical passage 34 which passes through the shaft 32 so that light can pass through the shaft. As shown in FIGS. 2 and 3, brackets 30 are placed on either side of the shaft to hold a light source 26 and an optical receptor 28. The optical measuring system is shown in more detail in FIGS. 5–10. In these figures, the arrow 90 indicates the direction of rotation of the shaft 32 and, where appropriate, the disk 94. Normally, the shaft 32 prevents light from the light source 26 from being detected at the optical receptor 28 (as shown in FIG. 6). But when the shaft rotates to the position shown in FIG. 5, light from the light source 26 can pass through the optical passage 34 and be detected at the optical receptor 28. As the shaft illustrated in FIGS. 5 and 6 completes one revolution, the optical receptor 34 will have detected two light signals. If additional precision is needed, multiple optical passages 92 may be used in the shaft as illustrated in FIG. 7. In this shaft, with three separate optical passages, one shaft revolution will result in six light signals. If more than one or two optical passages 34 in the shaft are desired, it is preferred that a disk 94 be adapted to fit over the end of the shaft extending from the hot manifold assembly 10 as shown in FIGS. 8–10. The disk 94 can have one optical passage 34 (as shown in FIG. 8) or more multiple optical passages 92 (as shown in FIGS. 9 and 10). Using a disk with multiple optical passages allows increased precision due to the increased distance "X" between adjacent optical passages (96 in FIG. 9; compare FIGS. 7 and 9). Having several disks 94 available with differing numbers of optical passages would allow the measuring precision to be varied relatively easily as the necessary physical modifications would be external to the hot manifold assembly 10. Using different spindles, as shown in FIGS. 11A, 11B, and 11C, would require at least partial dismantling of the hot manifold assembly 10 to vary the precision. To minimize resistance to rotation, it is preferred that the disks 94 be made of light-weight materials such as aluminum, plastic, or the like.

Conventional light sources 26 and optical receptors or detectors 28 can be used. For example, a light emitting diode (LED) can be used as the light source and a photomultiplier tube can be used as the light detector. If desired, the interior of the optical passages 34 can be coated with a non-reflective material to reduce false signals from reflective light. This may be especially important when multiple optical passages are used since such passages will intersect at the center of the shaft or disk.

In practice for gas-assited injection molding, plastic melt is injected into the hot manifold assembly from an extrusion machine. For each cavity, as the plastic flows past the spindle, the spindle and its attached shaft rotate. This rotation is measured at the optical detector which sends a signal to a rotational counter (preferably a computer register for each cavity). When the number of rotations (or fractions of rotations) equals the predetermined number of rotations for that cavity (corresponding to the target level), a signal is sent to the shut-off valve cylinder, whereby the shut-off valve is activated so that resin flow to that cavity is terminated. Preferably, at the same time the shut-off valve is activated to terminate the plastic flow, pressurized gas is injected into that cavity. And more preferably, the pressurized gas is also injected through the shut-off valve. After all the cavities are filled with their target levels of plastic and each has been injected with pressurized gas, the articles in the multiple cavity mold are allowed to cool sufficiently so that the articles are self supporting. After venting the pressurized gas, preferably through the same passages through which it was injected, the multiple cavity mold is opened and the molded articles removed. After resetting the rotational counters to zero, the system is ready for another molding cycle. As is apparent to those skilled in the art, conventional control systems using, for example, servo motors, solenoid valves, and the like, can be used in the practice of this invention. Furthermore, this invention is particularly suited to computer control systems for storing relevant data, making the necessary comparisons, and activating various valves as needed. Such computer control programs could be easily prepared using the flow chart of FIG. 1 and the explanation provided in this specification.

As will be appreciated by those skilled in the art, the present invention allows the control and metering of plastic material into multiple cavities of a multi-cavity injection mold in an effective and reproducible manner. Furthermore, the present invention is essentially insensitive to variations in plastic pressure, flow rates, temperature, and viscosity.

That which is claimed is:

1. An injection molding apparatus for use with a multiple cavity injection mold to produce a plurality of plastic articles, said apparatus comprising:
    (a) a plurality of nozzles wherein each nozzle contains a resin passageway within a nozzle body, wherein the resin passageway is in fluid communication at a downstream location with an associated article cavity within the multiple cavity injection mold;
    (b) a resin manifold having (1) an entry for connection with a resin extrusion machine and (2) a number of manifold passageways equal to the number of nozzles, where one end of each manifold passageway is in fluid communication with the entry and the other end of each manifold passageway is in fluid communication with the upstream end of the resin passageway of an associated nozzle;
    (c) a separate spindle for each nozzle, where the spindle is located within a combined passageway formed by the resin passageway of the associated nozzle and the associated manifold passageway and where the spindle is adapted to rotate in a reproducible manner in response to resin flowing around and past the spindle from an upstream to downstream direction;
    (d) a separate shut-off valve for each nozzle, where each shut-off valve is located within the resin passageway between the upstream end of the nozzle and the associated article cavity whereby the flow of resin can be controlled; and
    (e) a separate means for each nozzle for measuring the number of rotations the spindle associated with that nozzle makes due to resin flowing around and past the spindle; whereby for each nozzle, when the number of spindle rotations reaches a predetermined number for that nozzle, the shut-off valve for that nozzle can be activated to stop the flow of resin to that nozzle's associated article cavity independently of the flow of resin to the other article cavities.

2. An injection molding apparatus as defined in claim 1 wherein each spindle is rigidly attached to a cylindrical shaft whereby the shaft rotates axially along the same rotational axis as the spindle, wherein the shaft extends outside the nozzle body and resin manifold, and wherein the number of rotations of the spindle is determined by measuring the number of rotations of the shaft.

3. An injection molding apparatus as defined in claim 2 wherein that portion of the shaft extending outside the nozzle body and resin manifold has at least one passage through the shaft suitable for the passage of light and wherein the means for determining the number of rotations of the shaft is a light source and a light detector mounted on opposite sides of the shaft such that, as the shaft rotates, light from the light source can pass through the passage and be detected at the light detector.

4. An injection molding apparatus as defined in claim 3 wherein that portion of the shaft extending outside the nozzle body and resin manifold has more than one passage through the diameter of the shaft suitable for the passage of light and where each passage intersects at the center of the shaft.

5. An injection molding apparatus as defined in claim 2 wherein a disk is mounted on that portion of the shaft extending outside the nozzle body and resin manifold such that the disk rotates with the shaft and around the same axis as the shaft rotates; wherein the disk has at least one passage through the disk suitable for the passage of light; and wherein the means for determining the number of rotations of the shaft is a light source and a light detector mounted on opposite sides of the disk such that, as the shaft and disk rotate, light from the light source can pass through the passage and be detected at the light detector.

6. An injection molding apparatus as defined in claim 5 wherein the disk has more than one passage suitable for the passage of light and where each passage intersects at the center of the disk.

7. An injection molding apparatus as defined in claim 1 wherein each shut-off valve is located within the associated nozzle.

8. An injection molding apparatus as defined in claim 3 wherein each shut-off valve is located within the associated nozzle.

9. An injection molding apparatus as defined in claim 6 wherein each shut-off valve is located within the associated nozzle.

* * * * *